US008640807B2

(12) United States Patent
Takenaka

(10) Patent No.: US 8,640,807 B2
(45) Date of Patent: Feb. 4, 2014

(54) VEHICLE

(75) Inventor: Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 12/887,669

(22) Filed: Sep. 22, 2010

(65) Prior Publication Data

US 2011/0067939 A1 Mar. 24, 2011

(30) Foreign Application Priority Data

Sep. 24, 2009 (JP) ................................ 2009-219709

(51) Int. Cl.
*B62K 3/00* (2006.01)
(52) U.S. Cl.
USPC ........................... 180/218; 180/224; 701/124
(58) Field of Classification Search
USPC .............. 180/7.1, 21, 218–220, 224; 701/37, 701/124; 280/63–64
See application file for complete search history.

(56) References Cited

U.S. PATENT DOCUMENTS

| 6,915,878 | B2 * | 7/2005 | Kamen et al. | 182/141 |
| 7,275,607 | B2 | 10/2007 | Kamen et al. | |
| 7,717,200 | B2 * | 5/2010 | Kakinuma et al. | 180/6.5 |
| 7,866,429 | B2 * | 1/2011 | Ishii et al. | 180/218 |
| 8,170,781 | B2 * | 5/2012 | Fuwa | 701/124 |
| 2006/0097683 | A1 * | 5/2006 | Hosoda et al. | 318/568.12 |
| 2006/0260857 | A1 * | 11/2006 | Kakinuma et al. | 180/218 |
| 2008/0147281 | A1 * | 6/2008 | Ishii et al. | 701/49 |
| 2010/0017069 | A1 * | 1/2010 | Miki et al. | 701/48 |
| 2010/0017106 | A1 * | 1/2010 | Doi | 701/124 |
| 2010/0038960 | A1 | 2/2010 | Takenaka et al. | |
| 2010/0071984 | A1 * | 3/2010 | Doi et al. | 180/218 |
| 2010/0096905 | A1 | 4/2010 | Takenaka et al. | |
| 2010/0121539 | A1 * | 5/2010 | Price et al. | 701/50 |

FOREIGN PATENT DOCUMENTS

| JP | 2008-120347 A | 5/2008 |
| JP | 2008-513055 A | 5/2008 |
| JP | 2008-253565 A | 10/2008 |
| WO | 2006/031917 | 3/2006 |
| WO | 2008-132778 A1 | 11/2008 |
| WO | 2008-132779 A1 | 11/2008 |

OTHER PUBLICATIONS

JP Office Action, Notice of Reasons for Rejection, issued in corresponding patent application JP 2009-219709, with a mailing date of May 14, 2014, with English translation thereof.
JP Office Action, Notice of Reasons for Rejection, issued in corresponding patent application JP 2009-219709, with a mailing dated of May 14, 2013, with English translation thereof.

* cited by examiner

*Primary Examiner* — James English
(74) *Attorney, Agent, or Firm* — Carrier Blackman & Associates, P.C.; Joseph P. Carrier; Jeffrey T. Gedeon

(57) ABSTRACT

An inverted pendulum type vehicle provided with a body, a pair of wheels and that is attached to the pertinent body and that is arranged in parallel, drive mechanisms and that separately rotate the pertinent pair of wheels and around wheel axes, and a control member that controls the drive mechanisms and, wherein: the body is provided with a base to which the pair of wheels and is attached, a column disposed upright from the base, and a load-supporting part that is attached to the column and that sustains a payload; the column is joined to the base via a shaft that extends in a non-parallel direction relative to the wheel axes, and is provided so as to be capable of sliding around the shaft; and the shaft is provided with an actuator which imparts torque to the column that slides around the shaft with an orientation that is the reverse of the sliding direction of the column.

3 Claims, 6 Drawing Sheets

VEHICLE

FIELD OF THE INVENTION

The present invention relates to an inverted pendulum type vehicle.

Priority is claimed on Japanese Patent Application No. 2009-219709, filed Sep. 24, 2009. The content is incorporated herein by reference.

DESCRIPTION OF THE RELATED ART

In recent years, numerous inverted pendulum type vehicles have been proposed which can be maneuvered by intuitive manipulations involving weight shifts of the passenger. Previously, as this type of inverted pendulum type vehicle, vehicles have been offered which are provided with a pair of wheels that are laterally arranged in parallel, drive mechanisms that rotationally drive this pair of wheels, a control member that controls the drive mechanisms, and a body to which the pair of wheels is attached, as recorded, for example, in the U.S. Pat. No. 7,275,607, PCT International Publication WO2008/132778, and PCT International Publication WO2008/132779. The aforementioned body is provided with a base to which the wheels and the drive mechanisms are joined, and a column erected on the base. A handle gripped by the passenger is provided on the aforementioned column, and this column is capable of laterally sliding with the center point sliding at the part that connects with the base. With this type of inverted pendulum vehicle, boarding is conducted in an erect posture by placing both feet on steps of the aforementioned body, and gripping the handle. The aforementioned body is tilted forward or backward by the forward or backward movement of the passenger's body weight, and forward/backward movement and speed adjustment of the vehicle are being conducted according to the direction of inclination and angle of inclination. The vehicle is being turned and changes course by having the passenger laterally move the handle and laterally slide the column during travel.

SUMMARY OF THE INVENTION

However, with the aforementioned conventional inverted pendulum type vehicle, as the connecting part of the column and the base is the center point sliding of the column, and as the center point sliding of the column is distanced from the ground contact surfaces of the wheels, when the column is slid either to the left or right in a state where a load is imposed on the column during travel, a moment occurs at the base around the center point sliding of the column. As a result, there is a risk that the balance of the load imposed on the left and right wheels will be lost, and that one of the wheels will spin out. To explain in further detail, as shown in FIG. 6, when a column 53 is tilted either to the left or right at only θ (angle) in a state where a load mg is exerted on the column 53, a lateral force of mg sin θ (≈mgθ) is exerted on the connecting part of the base 52 and column 53. At this time, as the height from a road surface S of the connecting part (center point sliding) of the base 52 and column 53 is h, a moment of hmgθ is exerted on a body 5, increasing reactive force on one of the wheels 2L proportional to this moment (hmgθ). As a result, the body 5 tilts, and the other wheel 2R may spin out. For example, in the case of an inverted pendulum type vehicle of the type where a saddle is provided on the column, and where operation is conducted in a state where the passenger is seated on the saddle, the load of the passenger is constantly being exerted on the column. Consequently, when the passenger shifts his/her body weight either to the left or right side during travel and changes course, the load imposed on the wheel of one side is less than the load imposed on the wheel of the other side, and there is a risk that the wheel of that one side may spin out.

The present invention was made in light of the foregoing conventional problem, and its object is to offer an inverted pendulum type vehicle which inhibits loss of lateral balance, and which prevents spin-out of one of the wheels, even when the column slides to the right or left in a state where a load is imposed on the column.

The vehicle of the present invention is an inverted pendulum type vehicle provided with a body, a pair of wheels that is attached to the pertinent body and that is arranged in parallel, drive mechanisms that separately conduct rotational driving of the pertinent pair of wheels around wheel axes, and a control member that controls the pertinent drive mechanisms, wherein: the aforementioned body is provided with a base to which the aforementioned pair of wheels is attached, a column disposed upright from the pertinent base, and a load-supporting part that is attached to the pertinent column and that sustains the load of an object with weight; the aforementioned column is joined to the aforementioned base via a shaft that extends in a non-parallel direction relative to the aforementioned wheel axes, and is provided so as to be capable of sliding around the aforementioned shaft; and the aforementioned shaft is provided with an actuator which imparts torque to the aforementioned column that slides around the pertinent shaft with an orientation that is the reverse of the sliding direction of the pertinent column.

Therefore, when the column slides either to the left or right in a state where a load is imposed on the column during travel, torque with an orientation that is the reverse of the sliding direction of the column is imparted to the column by the actuator. As a result, the moment that is generated around the shaft (center point sliding) by the sliding of the column is reduced or canceled by the torque of the aforementioned actuator. That is, as reactive force increases on one of the wheels in proportion to the moment (hmgθ) shown in FIG. 6 as stated above, a force corresponding to the aforementioned moment (hmgθ) is applied by an actuator such as a motor or spring whose spring coefficient constitutes hmg, thereby inhibiting the increase in reactive force on one of the wheels.

In addition, in the vehicle of the present invention, it is preferable to provide an inclination sensor which measures the angle of inclination of the aforementioned column, and to control the aforementioned actuator according to the angle of inclination outputted from the pertinent inclination sensor.

This has the result that appropriate torque is imparted to the column by the actuator according to the angle of inclination (sliding amount) of the column, whereby the moment around the shaft (center point sliding) caused by the sliding of the column is reliably reduced or canceled.

In addition, in the aforementioned vehicle of the present invention, it is preferable to provide a load sensor which measures load exerted on the aforementioned load-supporting part, and to control the aforementioned actuator according to the load amount outputted from the pertinent load sensor.

This has the result that appropriate torque is imparted to the column by the actuator according to the load exerted on the column, whereby the moment around the shaft (center point sliding) caused by the sliding of the column is reliably reduced or canceled.

The vehicle of the present invention may also be an inverted pendulum type vehicle provided with a body, a pair of wheels that is attached to the pertinent body and that is arranged in parallel, drive mechanisms that separately conduct rotational driving of the pertinent pair of wheels around wheel axes, and a control member that controls the pertinent drive mechanisms, wherein: the aforementioned body is provided with a base to which the aforementioned pair of wheels is attached, a column disposed upright from the pertinent base, and a load-supporting part that is attached to the pertinent column and that sustains the load of an object with weight; and the aforementioned column is joined to the aforementioned base via a connecting part that is capable of movement with an upward orientation along a convex arc trajectory around an axial line that extends in a non-parallel direction relative to the aforementioned wheel axes, and is provided so as to be capable of sliding around the axial line of the aforementioned arc trajectory.

Therefore, the center point sliding of the column is positioned at the center point of the arc trajectory of the connecting part, and is positioned lower than the connecting part. This has the result of reducing the moment exerted on the base when the column slides.

Note that the aforementioned "arc trajectory" includes not only trajectories formed in an arc of a true circle, but also trajectories formed in ellipsoidal arcs.

In addition, in the aforementioned vehicle of the present invention, it is preferable that the axial line of the aforementioned arc trajectory be set at a position of a road surface where the aforementioned wheels make ground contact.

This has the result that a moment is no longer exerted on the base when the column slides, because the center point sliding of the column is set at the road surface.

According to the vehicle of the present invention, it is possible to inhibit loss of lateral balance, and prevent one of the wheels from spinning out, even when the column slides to the left or right in a state where a load is imposed on the column.

DETAILED DESCRIPTION OF THE INVENTION

Below, embodiments of the vehicle of the present invention are explained with reference to drawings.

Embodiment 1

First, the configuration of the inverted pendulum type vehicle of a first embodiment is described.

Figure 1:
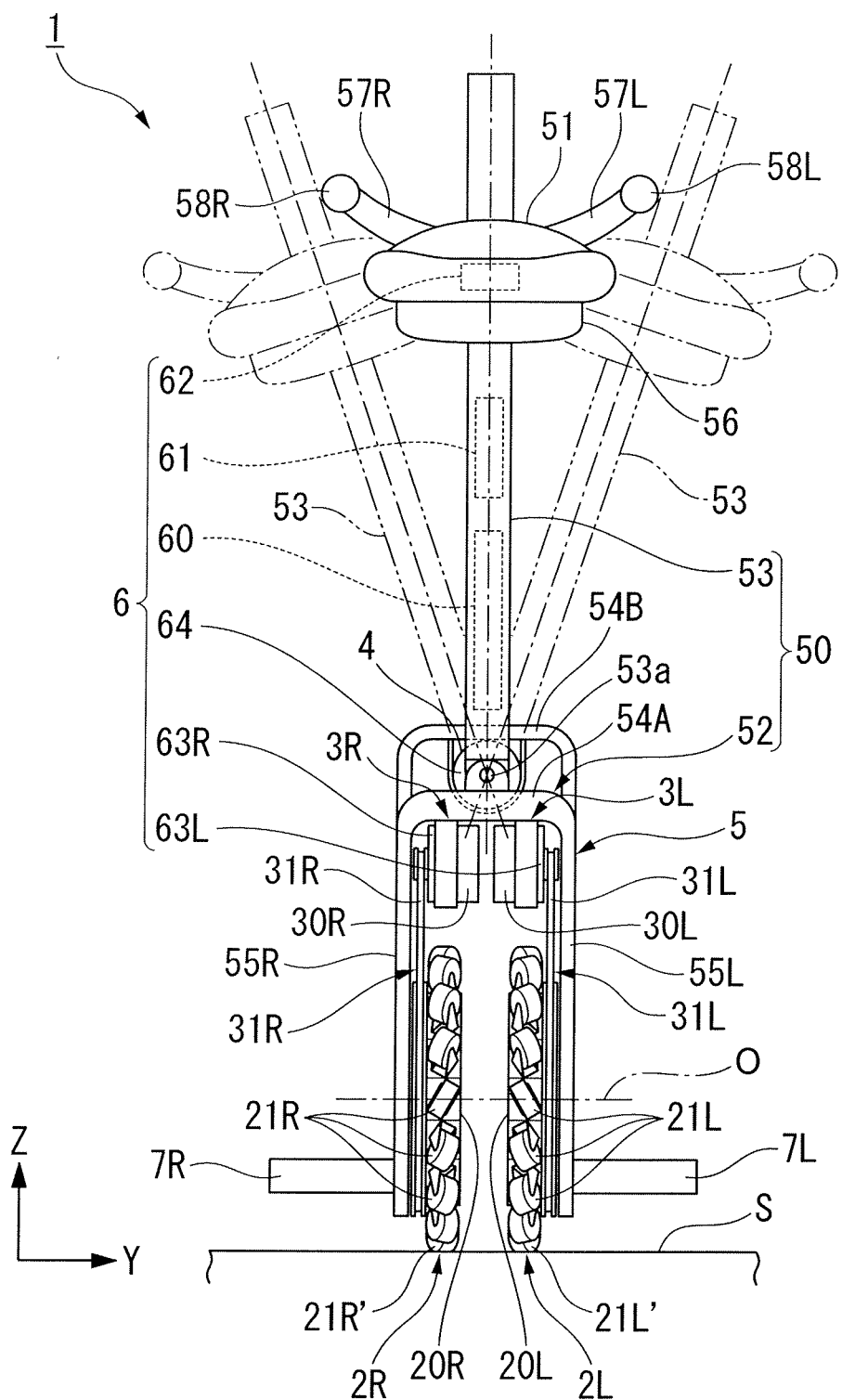
FIG. 1 is a frontal view of an inverted pendulum type vehicle that serves to explain a first embodiment of the present invention.
Figure 2:
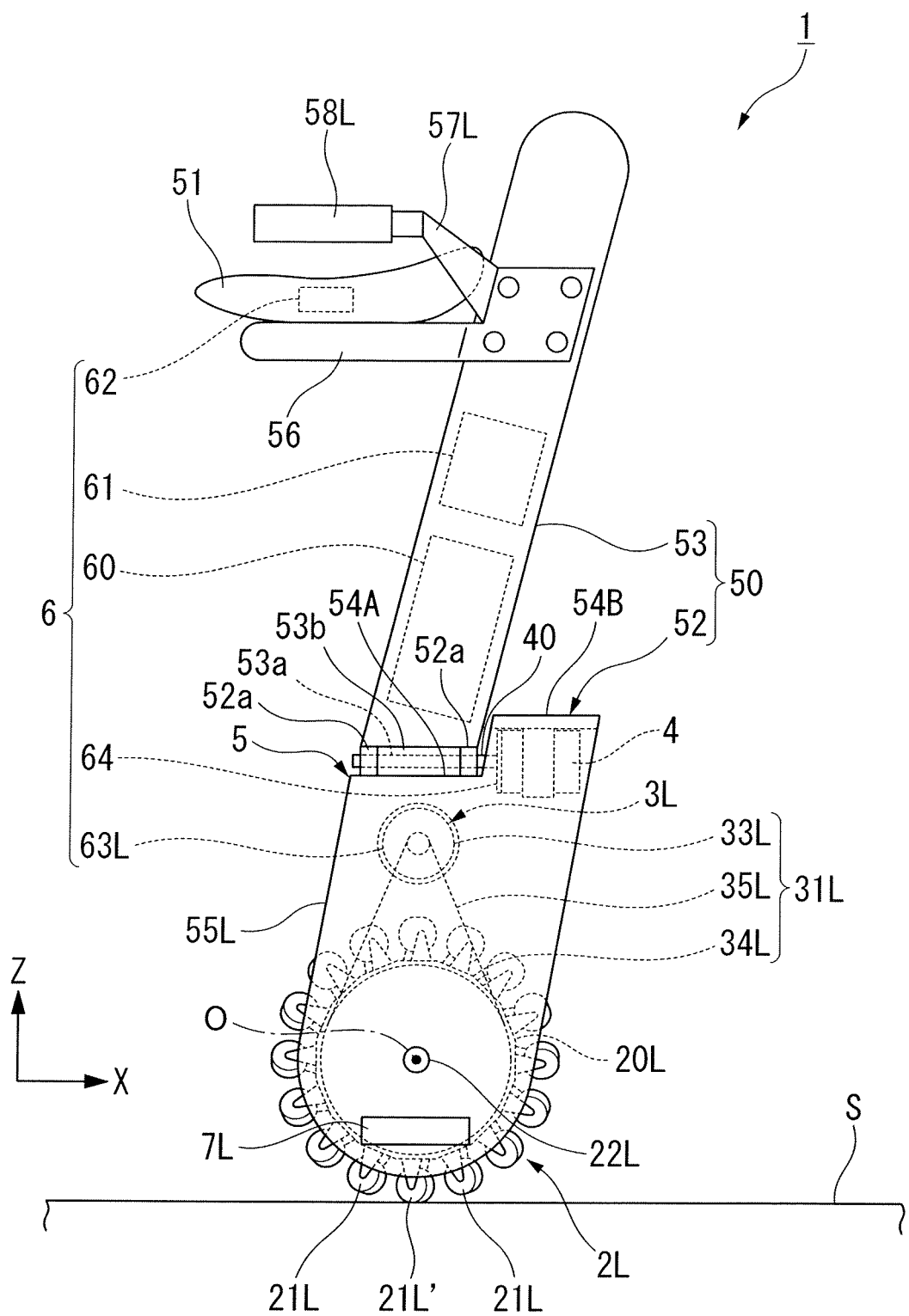
FIG. 2 is a side view of an inverted pendulum type vehicle that serves to explain the first embodiment of the present invention.

As shown in FIG. 1 and FIG. 2, a vehicle 1 of the present embodiment is an omnidirectional mobile vehicle capable of moving in all directions (all two-dimensional directions including the anteroposterior directions and lateral directions) on a road surface S, and is an electrically driven vehicle of inverted pendulum type regarding which a passenger mounted on the pertinent vehicle 1 conducts body weight movement in the desired direction and degree, thereby causing it to travel in the direction of body weight movement at a speed proportional to the degree of body weight movement. As for the schematic configuration of this vehicle 1, it is provided with a body 5, a pair of wheels 2R and 2L attached to the body 5 and arranged in parallel, drive mechanisms 3R and 3L which respectively impart the motivity that drives this pair of wheels 2R and 2L to the pertinent wheels 2R and 2L, and which separately conduct rotational driving of the pair of wheels 2R and 2L, an actuator 4 that imparts torque to a below-described shaft 53a that connects a base 52 and a column 53, and a control member 6 that controls the drive mechanisms 3 and actuator 4.

Here, in describing the present embodiment, "lateral direction" and "anteroposterior direction" respectively signify directions that coincide or approximately coincide with the lateral and anteroposterior directions of the upper body of a passenger who is mounted in a standard posture on the body 5. "Standard posture" is the posture that is assumed for design purposes with respect to the body 5, and is a posture where the trunk axis of the upper body of the passenger is approximately vertical, and the upper body is not twisted. That is, the crosswise direction (Y axis) in FIG. 1 is the "lateral direction" of the vehicle 1, the left side in FIG. 1 is the "right side" of the vehicle 1, and the right side in FIG. 1 is the "left side" of the vehicle 1. The crosswise direction (X axis) in FIG. 2 is the "anteroposterior direction" of the vehicle 1, the left side in FIG. 2 is the "front side" of the vehicle 1, and the right side in FIG. 2 is the "rear side" of the vehicle 1. Moreover, the perpendicular direction (Z axis) in FIG. 1 and FIG. 2 is the "vertical direction" of the vehicle 1, the upper side in FIG. 1 and FIG. 2 is "upward" with respect to the vehicle 1, and the lower side in FIG. 1 and FIG. 2 is "downward" with respect to the vehicle 1. Furthermore, in the description of the present embodiment, the suffixes "R" and "L" affixed to reference numerals respectively signify what corresponds to the right side and left side of the vehicle 1. In addition, "road surface S" is the surface of the travel path traveled by the vehicle 1, and includes not only outdoor road surfaces, but also indoor road surfaces such as, for example, a floor surface of a building.

The body 5 is provided with a base 52 to which are joined the pairs of wheels 2R and 2L and drive mechanisms 3R and 3L, a column 53 that is disposed upright from the base 52, and a saddle 51 (equivalent to the load-supporting part of the present invention) that is attached to the column 53. As for the base 52, in addition to being a support part that supports the pair of wheels 2R and 2L, drive mechanisms 3R and 3L, and actuator 4, it is also a cover that covers the wheels 2R and 2L, drive mechanisms 3R and 3L, and actuator 4, and is formed into an approximately inverted U-shape from a longitudinal sectional perspective. To explain in further detail, the base 52 is provided with a front top plate 54A that covers the wheels 2R and 2L from above, a rear top plate 54B that is disposed to the rear of the front top plate 54A, and a pair of side plates 55R and 55L that are respectively suspended from both the left and right end parts of the front top plate 54A and rear top plate 54B and that cover the wheels 2R and 2L from both the left and right sides. The rear top plate 54B is arranged at a position that is behind and diagonally above the front top plate 54A, and is disposed at a position that is higher than the front top plate 54A. Moreover, steps 7R and 7L upon which the feet of the passenger are placed respectively protrude from the respective outer faces of the side plates 55R and 55L so as to extend rightward and leftward.

The column 53 is a rectangular tube member disposed upright from the front top plate 54A; it is upwardly oriented, and inclined toward the rear. At the lower end of the column 53, a rod-like shaft 53a is provided that extends in a non-parallel direction relative to wheel axes O, specifically, in the anteroposterior direction (in the direction that is orthogonal to the wheel axes O). The column 53 is coupled to the base 52 via the shaft 53a, and is provided so as to be capable of sliding around the shaft 53a. To explain in further detail, a shaft retainer 53b that is of approximately semicircular shape from a cross-sectional perspective and that extends in the anteroposterior direction is fixed to a lower end face of the column 53, and the shaft 53a is held by this shaft retainer 53b. In addition, shaft receivers 52a that support the shaft 53a so that it is capable of freely rotating are disposed upright at the top face of the front top plate 54A of the base 52. These shaft receivers 52a are interstitially disposed in parallel in the anteroposterior direction, and the shaft retainer 53b is disposed between this pair of shaft receivers 52a and 52a.

In addition, the actuator 4 which imparts torque to the column 53 that slides around the shaft 53a with an orientation that is the reverse of the sliding direction of the column 53 which is provided at the shaft 53a. To explain in further detail, the actuator 4 is an electric motor that causes axial rotation of an output shaft 40; it is disposed to the rear of the shaft 53a, and is fixed to the bottom face of the rear top plate 54B of the base 52. The output shaft 40 is coupled to the end part of the rear side of the shaft 53a, and torque is propagated to the shaft 53a via this output shaft 40.

Furthermore, a saddle bracket 56 that projects frontward is fixed to the upper part of the column 53, and the saddle 51 is furnished on top of this saddle bracket 56. This saddle 51 is a seat on which the passenger sits, and is a load-supporting part that sustains the load of the passenger (an object with weight). That is, the vehicle 1 of the present embodiment moves on the road surface S with the passenger in a sitting posture on the saddle 51.

Furthermore, grip bars 57R and 57L that project frontward from the column 53 and that are respectively disposed on both the right and left sides of the saddle 51 are fixed to the upper part of the pertinent column 53, and grips 58R and 58L are respectively provided at the distal ends of both of these grip bars 57R and 57L.

On the other hand, the paired wheels 2R and 2L are respectively disposed on the inner sides of the base 52 (between the pair of side plates 55R and 55L); they are arranged in mutual lateral opposition, and their respective wheel axes O extend along the same line. To explain in further detail, as shown in FIG. 3, the wheels 2R and 2L are provided with rotators 20R and 20L that are disposed approximately vertically relative to the road surface S, and with multiple free rollers 21R and 21L that are disposed at equal intervals around the entire circumference of the periphery of the rotators 20R and 20L.

The rotators 20R and 20L are wheel bodies of regular polygonal shape on whose outer circumferential faces are formed multiple planar parts 20a consecutively provided in an annular manner around the wheel axes O, and are arranged parallel to the inner faces of the side plates 55R and 55L. At the central parts of these rotators 20R and 20L are provided shaft members 22R and 22L whose central axial lines are the wheel axes O. The rotators 20R and 20L are rotatably supported by the side plates 55R and 55L via the shaft members 22R and 22L, and are capable of rotating around the wheel axes O. The multiple planar parts 20a are each formed vertically in the radial direction (the direction orthogonal to the wheel axes O) of the rotators 20R and 20L.

The free rollers 21R and 21L are cylindrical bodies capable of freely rotating around rotational axes PR and PL, and are each individually provided on the respective planar parts 20a of the rotators 20R and 20L. These free rollers 21R and 21L are ground contact members that contact the road surface S by moving to the lower end of the rotators 20R and 20L in conjunction with the rotation of the rotators 20R and 20L. The vehicle 1 is supported on the road surface S via free rollers 21R' and 21L' at the lower end positions of the rotators 20R and 20L.

Figure 3:
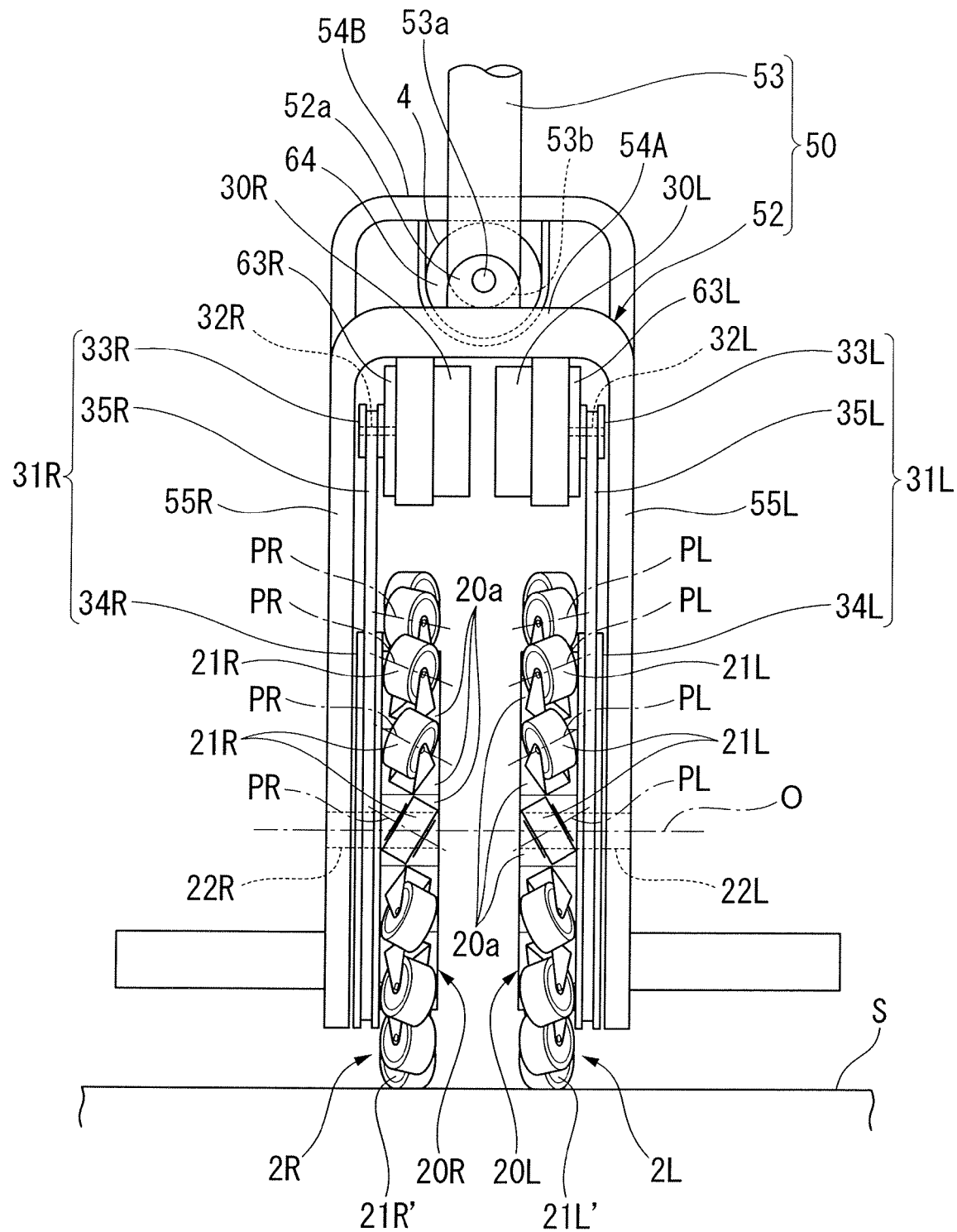
FIG. 3 is an enlarged frontal view of the lower part of an inverted pendulum type vehicle that serves to explain the first embodiment of the present invention.

Moreover, not only do the free rollers 21R and 21L project in the radial direction of the rotators 20R and 20L as shown in FIG. 2, but they are also diagonally arranged relative to the axial direction of the rotators 20R and 20L as shown in FIG. 3. The rotational axes PR and PL of the free rollers 21R and 21L extend in parallel with the planar parts 20a, and are inclined relative to the wheel axes O. To explain in further detail, when the free rollers 21R and 21L of both sides are disposed at the ground contact portion where the road surface S is contacted (the lower end position of the rotators 20R and 20L), they are disposed so that their respective rotational axes PR and PL respectively extend in parallel with the road surface S, and the interstice of the pertinent rotational axes PR and PL gradually contracts as it approaches the rear side with an inverted V-shaped orientation from the planar perspective. In short, the free rollers 21R and 21L are attached so that, at the ground contact portions, the angular orientations of their rotational axes PR and PL enter between the wheel axes O frontwardly relative to the wheel axes O, and among the multiple free rollers 21R and 21L, the rotational axes PR and PL of the free rollers 21R' and 21L' at the ground contact portions that contact the road surface S are rearwardly inclined as one heads from the outer side toward the inner side in the lateral direction viewed from the planar perspective. In other words, in the case where, for example, the wheels 2R and 2L (rotators 20R and 20L) are rotated in the forward direction, the multiple free rollers 21R and 21L are respectively attached so that the lateral force exerted on both sides of the free rollers 21R and 21L that contact the road surface S is outwardly oriented, that is, the lateral force of the free roller 21R on the right side is rightwardly oriented, while that of the free roller 21L on the left side is leftwardly oriented.

The drive mechanisms 3R and 3L are provided with power sources 30R and 30L, and power transmission member 31R and 31L that transmit the power outputted by the power sources 30R and 30L to the wheels 2R and 2L.

The power sources 30R and 30L are electric motors that output torque, and are provided on the inner side of the base 52. To explain in further detail, the power sources 30R and 30L are disposed above the wheels 2R and 2L, and are fixed to the front top plate 54A of the base 52.

The power transmission member 31R and 31L are mechanisms that connect the output shafts 32R and 32L of the power sources 30R and 30L and the shaft members 22R and 22L of the wheels 2R and 2L, and that transmit the torque of the output shafts 32R and 32L to the shaft members 22R and 22L, and is provided with the function of a reduction gear. Specifically, the power transmission member 31R and 31L are provided with small-diameter drive pulleys 33R and 33L attached to the output shafts 32R and 32L, large-diameter driven pulleys 34R and 34L attached to the shaft members 22R and 22L of the wheels 2R and 2L, and belts 35R and 35L wound around these drive pulleys 33R and 33L and driven pulleys 34R and 34L. The driven pulleys 34R and 34L are disposed between the side plates 55R and 55L of the base 52 and the rotators 20R and 20L of the wheels 2R and 2L, and the drive pulleys 33R and 33L are provided above these driven pulleys 34R and 34L. It is also possible to integrally form at least any two of the rotators 20R and 20L, shaft members 22R and 22L, and driven pulleys 34R and 34L.

As shown in FIG. 1 and FIG. 2, the control member 6 controls the drive mechanisms 3R and 3L according to the posture of the body 5, and causes the vehicle 1 to travel in the desired direction at the desired speed; it controls the actuator 4 according to the lateral angle of inclination of the column 53, and imparts a prescribed torque to the shaft 53a. Specifically, the control member 6 is provided with: a control unit 60 constituted by a microcomputer and an electronic circuit unit containing drive circuit units, etc. of the power sources 30R and 30L; an inclination sensor 61 for measuring the angle of inclination relative to the vertical direction (direction of gravitational force) of the column 53 and its speed of change; a load sensor 62 for detecting whether or not a passenger is mounted on the vehicle 1; rotary encoders 63R and 63L that serve as angle sensors for detecting the rotational angles and rotational angle speeds of the respective output shafts 32R and 32L of the power sources 30R and 30L; and a rotary encoder 64 that serves as an angle sensor for detecting the rotational angle and rotational angle speed of the output shaft 40 of the actuator 4.

The control unit 60 and inclination sensor 61 are, for example, attached to the column 53 of the body 5 such that they are housed inside the pertinent column 53. The load sensor 62 is incorporated into the saddle 51. Moreover, the rotary encoders 63R and 63L of the power sources 30R and 30L are respectively integrated with the power sources 30R and 30L, while the rotary encoder 64 of the actuator 4 is integrated with the actuator 4. It is also acceptable to respectively attach the rotary encoders 63R and 63L of the power sources 30R and 30L to the rotators 20R and 20L, and to attach the rotary encoder 64 of the actuator 4 to the shaft 53a of the column 53.

In further detail, the inclination sensor 61 is composed of an acceleration sensor and a rate sensor (angularity sensor) such as a gyro sensor, and the detection signals of these sensors are outputted to the control unit 60. Based on the outputs of the acceleration sensor and rate sensor of the inclination sensor 61, the control unit 60 performs prescribed measuring and arithmetic processing (conventional arithmetic processing), thereby computing a "measurement value of the angle of inclination in the vertical direction" of the member (column 53) mounted on the inclination sensor 61, and a "measurement value of the speed of the angle of inclination" which is its change in speed (differential value). It is also possible to compute the angle of inclination from a rotary encoder.

The load sensor 62 is incorporated into the saddle 51 so that it receives the load from the gravity of a passenger in the case where the pertinent passenger is mounted on the saddle 51, and detection signals corresponding to the load are outputted to the control unit 60. Based on load measurement values indicated by the outputs of this load sensor 62, the control unit 60 discriminates whether or not a passenger is mounted on the vehicle 1, and measures the amount of load exerted on the column 53.

The rotary encoders 63R and 63L of the power sources 30R and 30L and the rotary encoder 64 of the actuator 4 respectively generate pulse signals at each prescribed angle of rotation of the output shafts 32R, 32L and 40 of the respectively corresponding power sources 30R and 30L and actuator 4, and respectively output these pulse signals to the control unit 60. Based on these pulse signals, the control unit 60 measures the rotational angle of the output shafts 32R, 32L and 40 of the respectively corresponding power sources 30R and 30L and actuator 4, and also measures the rate of change over time of the measurement values of the rotational angles (differential values) as the rotational angle speeds of the power sources 30R and 30L and actuator 4.

By performing the prescribed arithmetic processing using the aforementioned respective measurement values, the control unit 60 determines speed commands which are the respective target values of the rotational angle speeds of the power sources 30R and 30L, and conducts feedback control of the respective rotational angle speeds of the power sources 30R and 30L according to the speed commands.

As the relation between the rotational angle speeds of the output shafts 32R and 32L of the power sources 30R and 30L and the rotational angle speeds of the rotators 20R and 20L corresponding to the power sources 30R and 30L is a proportional relation corresponding to a speed reduction ratio of fixed value between the pertinent output shafts 32R and 32L and rotators 20R and 20L, for purposes of convenience in the description of the present embodiment, the rotational angle speeds of the power sources 30R and 30L signify the rotational angle speeds of the rotators 20R and 20L.

By performing the prescribed arithmetic processing using the aforementioned respective measurement values, the control unit 60 determines speed commands which are the respective target values of the rotational angle speeds of the actuator 4, and conducts feedback control of the respective rotational angle speeds of the actuator 4 according to the speed commands. To explain in further detail, based on the "angle of inclination in the vertical direction" outputted from the inclination sensor 61, "load amount exerted on the column 53" outputted from the load sensor 62, "rotational angle" of the shaft 53a (actuator 4) outputted from the rotary encoder 64 of the actuator 4, and height from the road surface S of the (central axial line of the) shaft 53a, the control unit 60 determines the target value of torque so that the moment around the shaft 53a exerted on the base 52 is canceled or reduced, and conducts feedback control of the rotational angle speed of the actuator 4 according to the speed commands.

Next, the operations of the vehicle 1 of the above configuration are described.

First, with respect to the vehicle 1, the load sensor 62 senses whether or not a passenger is mounted on the vehicle 1, and transmits this to the control unit 60. Here, in a state where a passenger is not mounted on the vehicle 1, the control unit 60 controls the power sources 30R and 30L so that a self-supporting mode occurs, and the vehicle 1 supports itself and is stationary. That is, if the vehicle 1 is tilted, its direction of inclination and angle of inclination is detected by the inclination sensor 61, and the control unit 60 that receives the detection results controls the power sources 30R and 30L, and rotationally drives the wheels 2R and 2L appropriately so that the vehicle 1 maintains a self-supporting posture. That is, the target posture of the body 5 posture is set to a state where the center point of gravity of the vehicle 1 is positioned approximately directly above the center point of the pair of wheels 2R and 2L (center point of the wheel axes O)—more precisely, to a state where the pertinent center point of gravity is positioned approximately directly above the central position of the contact points of the free rollers 21R and 21L of both sides that contact the road surface S—and the rotational operations of the wheels 2R and 2L are controlled so that the actual posture of the pertinent body 5 coincides with the target posture, with the result that the vehicle 1 self-supports without inclination of the body 5. Consequently, the vehicle 1 remains stationary in a self-supporting posture.

On the other hand, when a passenger sits on the saddle 51 and is mounted on the vehicle 1, the load sensor 62 senses that a passenger is mounted. The control unit 60 that receives the detection results enters travel mode, and causes travel by controlling the power sources 30R and 30L according to the tilt of the body 5. That is, basically, in the case where a passenger seated in the saddle 51 inclines his/her upper body—more precisely, in the case where the upper body is inclined so that the position of the center point of gravity of the totality constituted by the passenger and the vehicle 1 (the position projected onto a horizontal surface) moves—the body 5 tilts toward the side to which the pertinent upper body is inclined. At this time, the power sources 30R and 30L are controlled by the control member 60, and the rotational operations of the wheels 2R and 2L are controlled so that the vehicle 1 moves toward the side to which the body 5 is inclined.

To explain in further detail, with respect to the vehicle 1 of the present embodiment, the ground contact surfaces of the wheels 2R and 2L (free rollers 21R and 21L) that constitute the entire ground contact surface are local regions of small area compared to the region where the entirety of the vehicle 1 and passenger mounted thereon is projected onto the floor surface, and the floor reaction force is only exerted on these local regions. Consequently, in order to prevent the body 5 from tilting, it is necessary to move the wheels 2R and 2L so that the center point of gravity of the entirety of the passenger and the vehicle 1 is positioned approximately directly above the center position of the ground contact surfaces of the pair of wheels 2R and 2L (free rollers 21R and 21L).

Thus, in the present embodiment, the target posture of the body 5 posture is set to a state where the center point of gravity of the entirety of the passenger and the vehicle 1 is positioned approximately directly above the center position of the ground contact surfaces of the pair of wheels 2R and 2L, and, basically, the rotational operations of the wheels 2R and 2L are controlled so that the actual posture of the body 5 is made to coincide with the target posture.

For example, when the operator leans his/her upper body forward or backward and causes the body 5 to tilt forward or backward, the direction of inclination and angle of inclination of the body 5 are detected by the inclination sensor 61, and based on the detection results, the control unit 60 controls the power sources 30R and 30L so that the paired rotators 20R and 20L are each rotationally driven in the same direction and at equal speed. When the paired rotators 20R and 20L are each rotationally driven in the same direction at the same speed, the free rollers 21R and 21L of the rotators 20R and 20L on both sides sequentially contact the road surface S from the same direction in conjunction with the rotational operation of the rotators 20R and 20L. At this time, lateral force (frictional force) with an orientation that is the reverse of the rotational direction of the rotators 20R and 20L is exerted on the two free rollers 21R and 21L at the ground contact portions that contact the road surface S between the free rollers 21R and 21L and the ground surface S, and the vectors in the direction orthogonal to the rotational axes PR and PL are canceled by the rotation of the free rollers 21R and 21L around the rotational axes PR and PL. Accordingly, only the vectors in the direction along the rotational axes PR and PL are exerted on the free rollers 21R and 21L at the ground contact portions. At this time, as the two free rollers 21R and 21L at the ground contact portions are arranged with an orientation such that the interstice of their respective rotational axes PR and PL gradually contracts as it heads rearward, the vectors of the two sides that are respectively exerted on the free rollers 21R and 21L of the two sides at the ground contact portions are line-symmetric with a centerline that extends in the anteroposterior direction as the axis of symmetry as they respectively head diagonally frontward or diagonally rearward. As a result, with respect to the aforementioned vectors of both sides, the components in the lateral direction are canceled, and the components in the anteroposterior direction are combined, and the entirety of the vehicle 1 is moved either forward or backward.

On the other hand, when the passenger leans his/her upper body to the left or to the right, the column 53 slides around the shaft 53a in that direction. At this time, the inclination sensor 61 detects the direction of inclination and angle of inclination of the body 5. Based on the detection results, the control unit 60 controls the power sources 30R and 30L so that the pair of rotators 20R and 20L is rotationally driven at equal speed in mutually opposite directions. When the pair of rotators 20R and 20L is rotationally driven at equal speed in mutually opposite directions, the free rollers 21R and 21L of the rotators 20R and 20L of the two sides sequentially contact the ground surface S from mutually opposite directions in conjunction with the rotational operation of the rotators 20R and 20L. At this time, only the vectors in the direction along the rotational axes PR and PL are exerted on the free rollers 21R and 21L at the ground contact portions. With respect to the vectors of both sides that are respectively exerted on the free rollers 21R and 21L of both sides at the ground contact portions, one is oriented diagonally frontward, and the other is oriented diagonally rearward. As a result, with respect to the aforementioned vectors of both sides, the components in the anteroposterior direction are canceled, and the components in the lateral direction are combined, and the entirety of the vehicle 1 is moved either leftward or rightward.

Moreover, at this time, based on the direction of inclination and angle of inclination of the column 53 detected by the inclination sensor 61, and the load amount exerted on the column 53 detected by the load sensor 62, the control unit 60 controls the actuator 4 so that torque with an orientation that is the reverse of the sliding direction of the column 53 is imparted to the shaft 53a. As a result, the moment around the shaft 53a that is exerted on the base 52 by the sliding of the column 53 is reduced or canceled by the torque of the actuator 4.

When the passenger leans his/her upper body diagonally relative to the lateral direction or the anteroposterior direction, and the body 5 tilts diagonally, the direction of inclination and angle of inclination of the body 5 is detected by the inclination sensor 61. Based on the detection results, the control unit 60 controls the power sources 30R and 30L so that the paired rotators 20R and 20L are each rotationally driven in the same direction at different speeds, or the paired rotators 20R and 20L are rotationally driven in mutually opposite directions at different speeds, or only one of the paired rotators 20R and 20L is rotationally driven while the other is suspended. As a result, due to the combination of the vectors exerted on the free rollers 21R and 21L of both sides, the entirety of the vehicle 1 is moved diagonally relative to the anteroposterior direction or lateral direction.

Thus, according to the vehicle 1, as the moment around the shaft 53a exerted on the base 52 is reduced or canceled when the column 53 slides to the right or left in a state where a load is imposed on the column 53, loss of balance is inhibited when the vehicle 1 moves rightward or leftward, and spin-out of one of the wheels 2R (2L) can be prevented. As a result, not only can vehicle handling stability be improved during travel, but it is also possible to experience excellent ride.

Embodiment 2

Next, the configuration of the inverted pendulum type vehicle of a second embodiment is described.

The vehicle 101 of the present embodiment is not provided with the actuator 4 of the vehicle 1 of the foregoing first embodiment, and the configuration of the connecting part of the base 52 and column 53 differs from that of the vehicle 1 of the aforementioned first embodiment, but the remaining configuration is identical to the configuration of the vehicle 1 of the aforementioned first embodiment. Accordingly, in the present embodiment, with respect to the configuration that is identical to the aforementioned first embodiment, the identical reference symbols are used, and explanation thereof is omitted.

Figure 4:
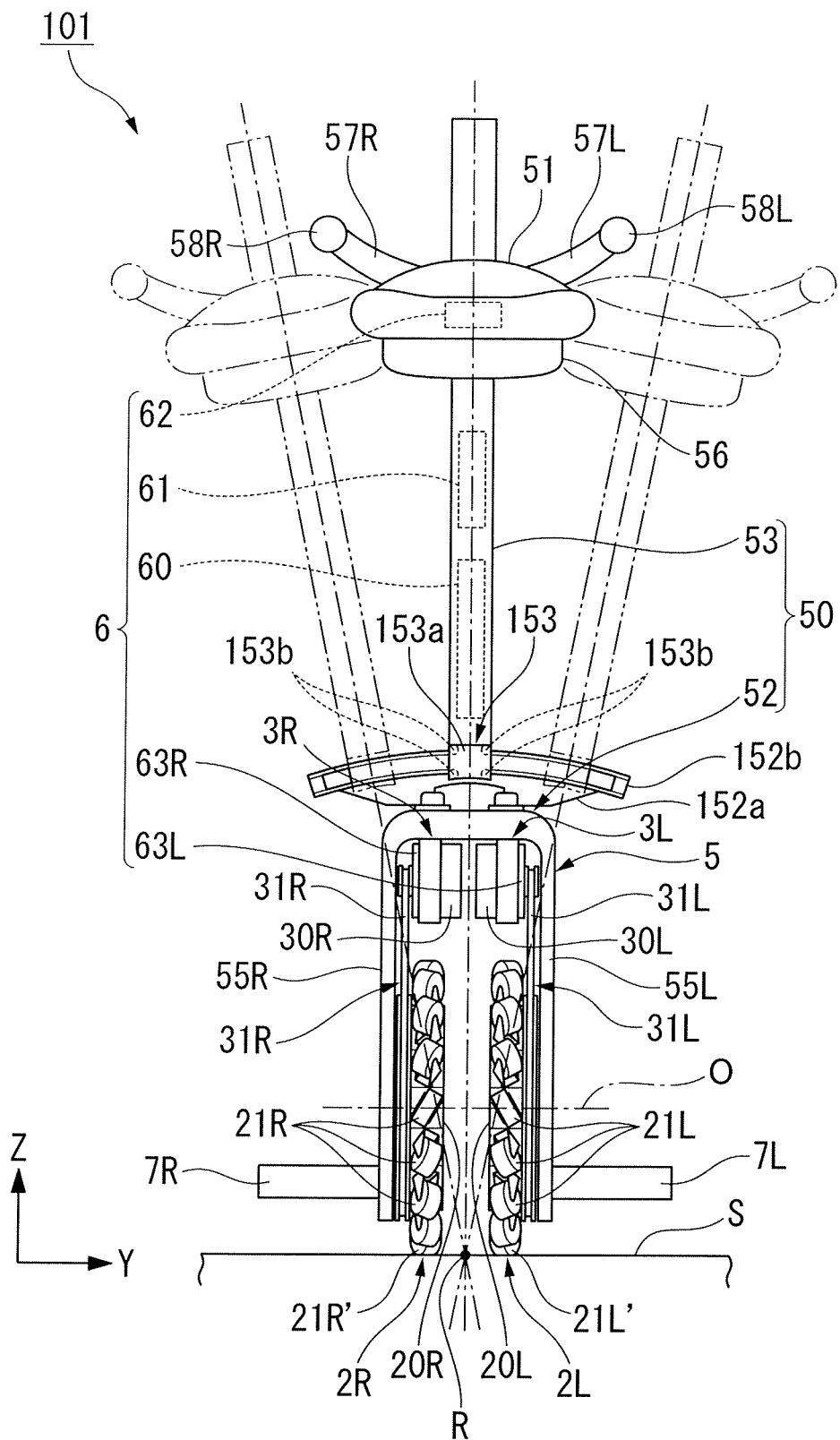
FIG. 4 is a frontal view of an inverted pendulum type vehicle that serves to explain a second embodiment of the present invention.
Figure 5:
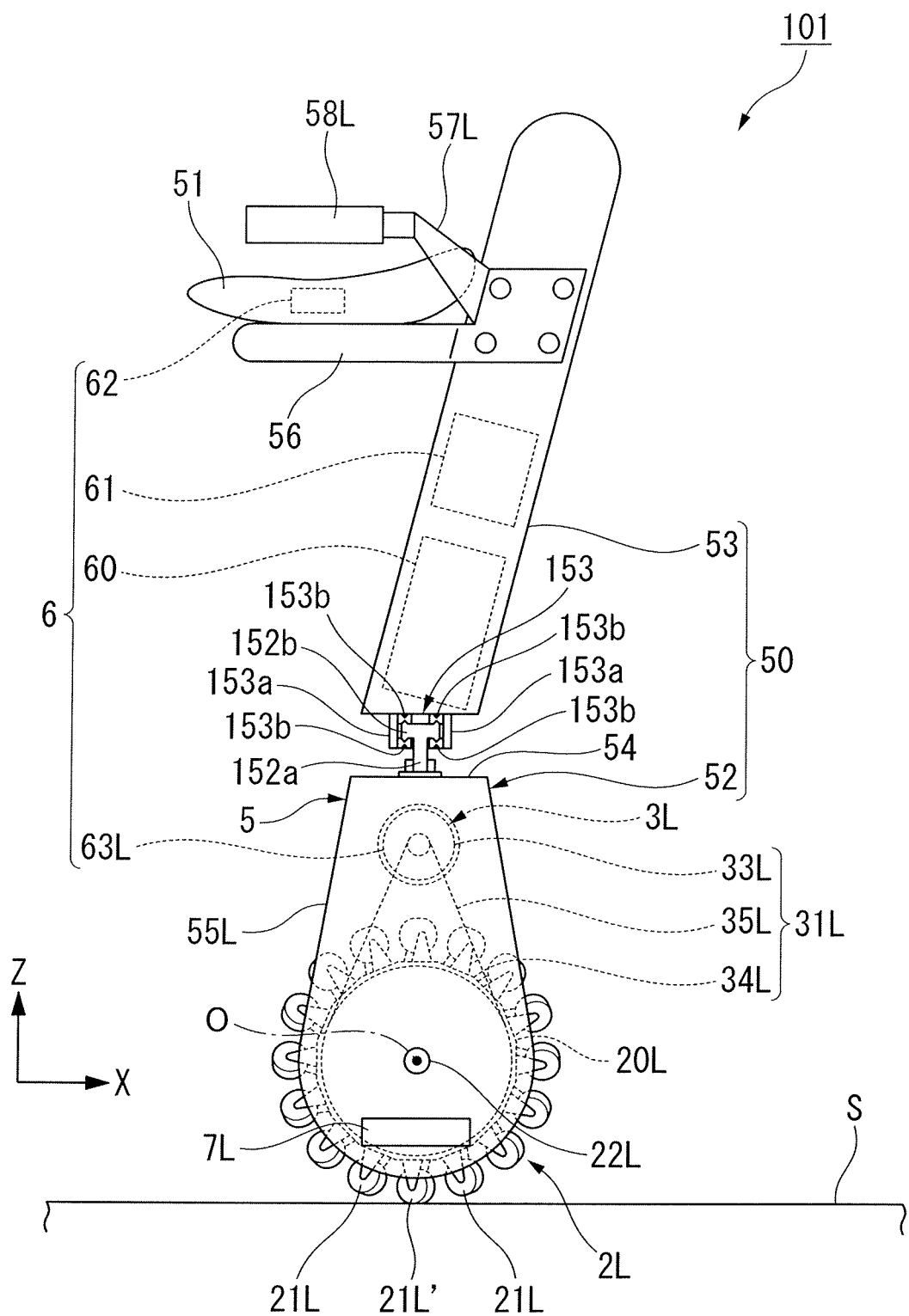
FIG. 5 is a side view of an inverted pendulum type vehicle that serves to explain the second embodiment of the present invention.
Figure 6:
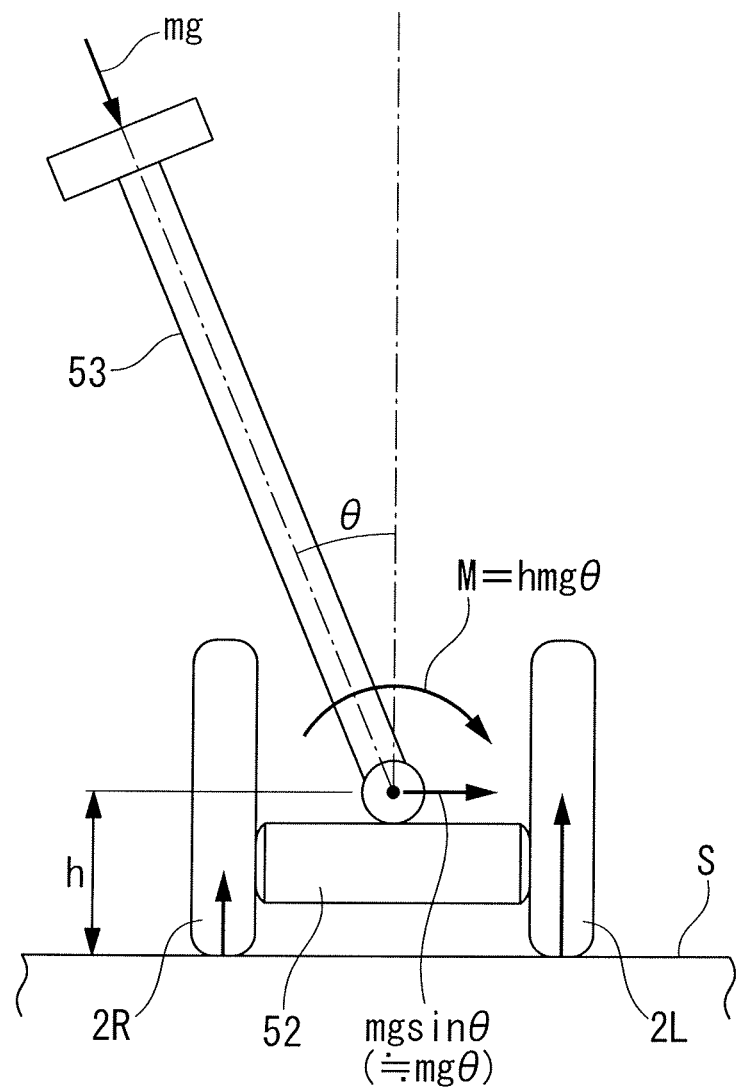
FIG. 6 is a schematic view that serves to mechanically explain a conventional inverted pendulum type vehicle.

As shown in FIG. 4 and FIG. 5, the column 53 of the vehicle 101 of the present embodiment is joined to the base 52 via a connecting part 153 that is capable of moving with an upward orientation along a convex arc trajectory around an axial line R that extends in a direction orthogonal to the wheel axes O, and is provided so as to freely slide around the axial line R of the aforementioned arc trajectory.

To explain in detail, a rail 152b is fixed to the top face of the top plate 54 of the base 52 via a support base 152a. The support base 152a is an approximately fan-shaped plate that is disposed upright above the top plate 54 of the base 52, and extends in a lateral direction along a virtual plane including the wheel axes O. A rail 152b is integrally fixed to the top end of this support base 152a. The rail 152b is in an arc-like strip that is disposed lengthwise in the lateral direction; it extends around the axial line R, and is formed in a bilaterally symmetric manner.

At the same time, the freely sliding connecting part 153 is fixed to the lower end of the column 53 along the rail 152b. This connecting part 153 is provided with paired substrates 153a and 153a which are runners that are attached to the rail 152b and that run atop the rail 152b, and which—in terms of skeletal framework—are disposed in a mutually opposite manner in the anteroposterior direction with interposition of the rail 152b, and multiple rollers 153b that are respectively axially supported by the substrates 153a and 153a and that roll in the lengthwise direction of the rail 152b. The paired substrates 153a and 153a are respectively fixed to the lower end face of the column 53, and the multiple rollers 153b are aligned in the lengthwise direction of the rail 152b, and are respectively disposed vertically with interposition of the rail 152b. The connecting part 153 attaches to the rail 152b by gripping the rail 152b from above and below with the multiple rollers 153b, attaches to the rail 152b by sandwiching the rail 152b from front and behind with the paired substrates 153a and 153a, and freely moves in an arc trajectory along the rail 152b. Note that the axial line R of the aforementioned arc trajectory, that is, the center point of the arc movement of the connecting part 153 is established at a position on the horizontal road surface S that has no irregularities and that is not laterally inclined, and is disposed at the intermediate position between the wheels 2R and 2L of both sides from a planar perspective.

According to the vehicle 101 of the foregoing configuration, when the column 53 is slid rightward or leftward in order to cause the vehicle 101 to travel rightward or leftward, the column 53 slides around the center point (axial line R) of the aforementioned arc trajectory. That is, the center point sliding of the column 53 is set at the position of the road surface S. Consequently, when the column 53 slides, a moment is not exerted at the base 52 around the aforementioned center point sliding. As a result, even when the column 53 laterally slides in a state where a load is imposed on the column 53, it is possible to inhibit loss of lateral balance, and prevent one of the wheels 2R (2L) from spinning out, and it is also possible to improve handling stability during travel, and enable excellent ride without using an actuator or the like.

While preferred embodiments of the omnidirectional mobile vehicle of the present invention have been described and illustrated above, it should be understood that these are exemplary of the invention, and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the foregoing embodiments, the descriptions concerned a vehicle 1 in which a saddle 51 is provided on a body 5, and which the passenger operates while in a seated posture on the saddle 51, but the present invention is not limited to a vehicle of the aforementioned seated style. For example, it is also acceptable to have a vehicle in which the body 5 is respectively provided with steps that are mounted by the two feet of the passenger, and a handle that is gripped by the passenger while standing on the steps, and which the passenger operates in a standing posture.

Moreover, in the foregoing embodiments, pulley-belt-style power transmission member 31R and 31L are provided which are composed of drive pulleys 33R and 33L, driven pulleys 34R and 34L, and belts 35R and 35L, but the present invention may have drive mechanisms provided with other power transmission member. For example, it is also acceptable to have member configured by sprockets and link chains, or member configured from multiple gears. Moreover, for example, it is also acceptable to laterally dispose the power sources 30R and 30L and the wheels 2R and 2L in parallel so that the output shafts 32R and 32L of the power sources 30R and 30L are coaxial with the shaft members 22R and 22L of the wheels 2R and 2L, and to respectively couple the output shafts 32R and 32L of the power sources 30R and 30L with the rotators 20R and 20L via reduction gears (planetary gear trains or the like).

Moreover, in the foregoing embodiments, the vehicle 1 is an omnidirectional mobile vehicle capable of moving in all directions provided with wheels 2R and 2L configured by the attachment of multiple free rollers 21R and 21L to the outer circumferential face of the rotators 20R and 20, but the present invention allows for appropriate modifications to the wheel structures. For example, it is also acceptable to have ordinary wheels furnished with rubber tires around the periphery of the wheels. In this case, the vehicle is capable of forward, backward, and turning movement (movement in a lateral direction is not possible).

Furthermore, in the foregoing embodiments, the wheels 2R and 2L (rotators 20R and 20L) are arranged approximately vertically relative to the road surface S, and are arranged in parallel in the arrow perspective of the anteroposterior direction, but with the present invention, the wheels 2R and 2L may be diagonally arranged relative to the road surface S. For example, it is also acceptable to arrange the wheels 2R and 2L of both sides in an inverted V-shape in a fragmentary view in the anteroposterior direction. That is, the upper ends of the wheels 2R and 2L of both sides may each be inwardly tilted in the lateral direction, and the interstice of the wheels 2R and 2L of both sides may assume a posture such that it gradually contracts as it heads upward. In this case, as the respective wheel axes O of the paired wheels 2R and 2L extend vertically relative to the respective rotators 20R and 20L, they do not extend along the same line, and assume a V-shape in the arrow perspective of the anteroposterior direction.

Moreover, in the aforementioned first embodiment, an electric motor that rotationally drives the output shaft 40 is installed as the actuator 4, but with the present invention, it is also possible to impart torque to the column 53 with an actuator other than an electric motor. For example, it is also possible to use a hydraulic motor, a hydropneumatic cylinder that combines rack and pinion, and so on. It is also possible to use a spring member with a prescribed spring coefficient (e.g., hmg) as the actuator.

Moreover, in the aforementioned first embodiment, the drive mechanisms 3R and 3L and the actuator 4 were controlled by a common control system (control member 6), but the present invention may adopt a configuration wherein the drive mechanisms 3R and 3L and the actuator 4 are controlled by different control systems.

In addition, in the aforementioned first embodiment, the rotational angle of the torque imparted to the shaft 53a is determined and the actuator 4 is controlled based on the height of the shaft 53a from the road surface S and the degree of inclination, etc. of the column 53, but with the present invention, it is also acceptable to control the actuator 4 by determining only the direction of torque (positive rotation or negative rotation) imparted to the shaft 53a. That is, even if the torque imparted to the shaft 53a by the actuator 4 does not perfectly match the moment around the shaft 53a that is exerted on the base 52, at least torque is imparted with a direction that is opposite that of the aforementioned moment, thereby enabling mitigation of the moment that is exerted on the base 52.

Moreover, in the aforementioned second embodiment, the configuration is adopted wherein the connecting part 153 moves in an arc by having the runner-shaped connecting part 153 slide along an arc-shaped rail 152b, but the present invention may also cause the connecting part to move in an arc by a configuration other than the aforementioned one. For example, a configuration may be adopted wherein the connecting part is moved in an arc using a link mechanism.

Otherwise, it is possible to replace the components of the aforementioned embodiments with conventional components in an appropriate manner that does not depart from the spirit or scope of the present invention, and the aforementioned variations may be appropriately combined.

The invention claimed is:

1. A vehicle comprising:
 a body;
 a pair of wheels that is attached to the body, and that is arranged in parallel;
 drive mechanisms that separately rotate the pair of wheels around wheel axes;
 and a control member that controls the drive mechanisms, wherein:
  the body is provided with a base to which the pair of wheels is attached, and a column disposed upright from the base for sustaining a payload with a load-supporting part that is attached thereon;
  the column is joined to the base via a shaft that extends in a non-parallel direction relative to the wheel axes, and is provided so as to be capable of sliding around the shaft; and
  the shaft is provided with an actuator, wherein
  the actuator is configured to impart torque to the column with an orientation that is the reverse of the sliding direction of the column; and
  the torque corresponds to a moment ($mgh\theta$), where mg is a load, h is a distance from a central axial line of the shaft to a traveling surface of the wheels, and $\theta$ is an angle of the sliding of the column.

2. The vehicle according to claim 1, wherein:
 an inclination sensor is provided which measures the angle of inclination of the column;
 and the actuator is controlled according to the angle of inclination outputted from the inclination sensor.

3. The vehicle according to claim 1 or 2, wherein:
 a load sensor is provided which measures the payload;
 and the actuator is controlled according to the load amount outputted from the load sensor.

\* \* \* \* \*